United States Patent
Takagi (10) Patent No.: US 9,408,068 B2
(45) Date of Patent: Aug. 2, 2016

(54) WIRELESS COMMUNICATION APPARATUS AND USER EQUIPMENT

(71) Applicant: KABUSHIKI KAISHA TOSHIBA, Tokyo (JP)

(72) Inventor: Masahiro Takagi, Toshima Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/475,410

(22) Filed: Sep. 2, 2014

(65) Prior Publication Data

US 2015/0264559 A1 Sep. 17, 2015

(30) Foreign Application Priority Data

Mar. 13, 2014 (JP) .................................. 2014-050865

(51) Int. Cl.
| | | |
|---|---|---|
| H04M 3/00 | (2006.01) | |
| H04W 8/22 | (2009.01) | |
| H04W 48/20 | (2009.01) | |
| H04W 84/12 | (2009.01) | |

(52) U.S. Cl.
CPC ................ *H04W 8/22* (2013.01); *H04W 48/20* (2013.01); *H04W 84/12* (2013.01)

(58) Field of Classification Search
CPC .................................................... H04B 7/2606
USPC ........................................................ 455/418
See application file for complete search history.

(56) References Cited

U.S. PATENT DOCUMENTS

| | | | |
|---|---|---|---|
| 7,343,162 B2 * | 3/2008 | Tandai et al. ................. 455/450 |
| 2004/0048609 A1 * | 3/2004 | Kosaka ...................... 455/422.1 |
| 2006/0003760 A1 * | 1/2006 | Li et al. ......................... 455/424 |
| 2007/0004430 A1 * | 1/2007 | Hyun et al. ................ 455/456.1 |
| 2009/0158400 A1 * | 6/2009 | Miyake ............................. 726/4 |
| 2011/0243060 A1 * | 10/2011 | Mildh et al. ................. 370/315 |
| 2013/0064180 A1 * | 3/2013 | Bergman et al. ............. 370/328 |
| 2013/0072196 A1 * | 3/2013 | Jung et al. ..................... 455/437 |
| 2013/0084795 A1 * | 4/2013 | Van Phan et al. .............. 455/15 |
| 2013/0136014 A1 * | 5/2013 | Lee et al. ...................... 370/252 |
| 2014/0220934 A1 * | 8/2014 | Zhang et al. ................. 455/410 |
| 2015/0063241 A1 * | 3/2015 | Shimezawa et al. .......... 370/329 |

FOREIGN PATENT DOCUMENTS

| | | |
|---|---|---|
| JP | 2008-060711 A | 3/2008 |
| JP | 2008-187348 A | 8/2008 |

* cited by examiner

*Primary Examiner* — Santiago Garcia
(74) *Attorney, Agent, or Firm* — Patterson & Sheridan, LLP (57) ABSTRACT

A wireless communication apparatus is connected to a wireless network, and is capable of functioning as a wireless network base station or as a wireless network terminal. The wireless apparatus comprises a connection control unit configured to, while the wireless communication apparatus functions as a wireless network base station, receive a configuration change request. In response to receiving said request, the connection control unit reconfigures the wireless communication apparatus to stop functioning as a wireless network base station and to start functioning as a wireless network terminal.

17 Claims, 5 Drawing Sheets

WIRELESS COMMUNICATION APPARATUS AND USER EQUIPMENT

CROSS-REFERENCE TO RELATED APPLICATION

This application is based upon and claims the benefit of priority from Japanese Patent Application No. 2014-050865, filed Mar. 13, 2014, the entire contents of which are incorporated herein by reference.

FIELD

Embodiments described herein relate generally to a wireless communication apparatus and user equipment.

BACKGROUND

A wireless communication apparatus may establish connectivity in a variety of ways. For example, a wireless local area network (LAN) terminal, such as a notebook PC or a tablet terminal, may switch between wireless LAN base stations as connection destinations. Furthermore, technology that enables a wireless LAN apparatus to switch between operating as a wireless LAN base station and as a wireless LAN terminal is known in the art. For example, one application of this technology may be seen in the field of digital cameras.

However, in many situations, an end user experiences difficulty in switching the connection destination of the tablet terminal or the digital camera manually. Furthermore, although some tablet terminals and digital cameras automatically switch between connection destinations or between operating modes (i.e., as a wireless base station or wireless LAN terminal), when the switching is performed, the user may be faced with a situation in which a connection is lost.

DETAILED DESCRIPTION

A wireless communication apparatus that is capable of switching between operating modes and user equipment capable of switching between connection destinations are provided.

In one embodiment, a wireless communication apparatus that is connected to a wireless network, and is capable of functioning as a wireless network base station or as a wireless network terminal is provided. The wireless communication apparatus includes a connection control unit configured to, while the wireless communication apparatus functions as a wireless network base station, receive a configuration change request. In response to receiving said request, the connection control unit reconfigures the wireless communication apparatus to stop functioning as a wireless network base station and to start functioning as a wireless network terminal.

Embodiments are described herein with reference to the drawings.

Figure 1A:
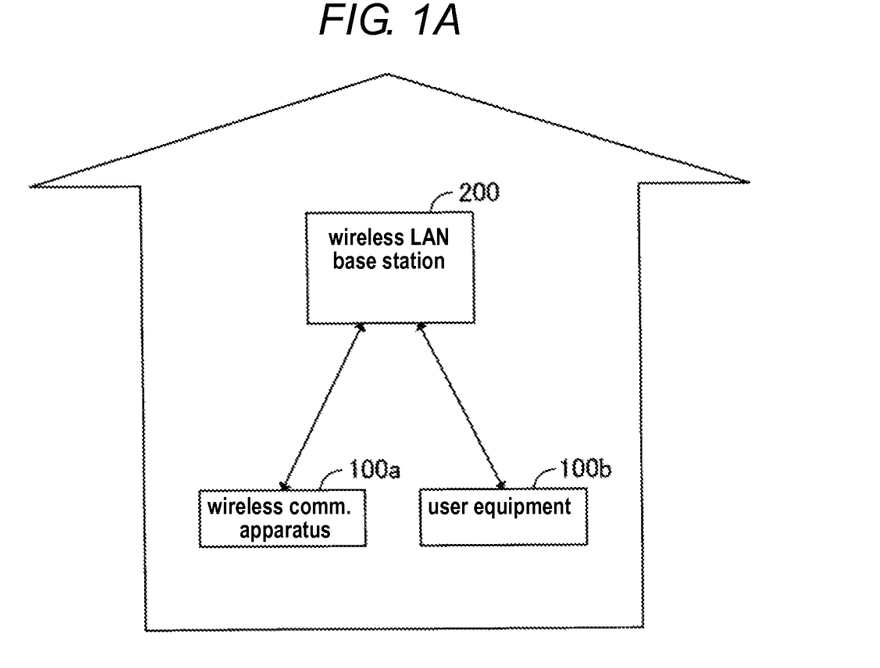
FIGS. 1A and 1B are conceptual diagrams illustrating a wireless communication system, according to an embodiment.
Figure 1B:
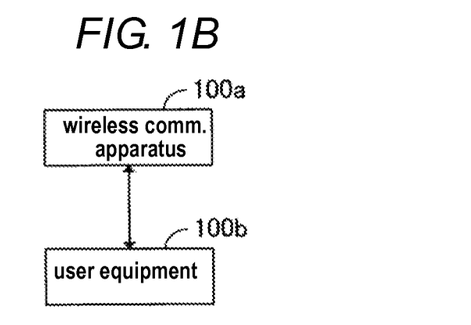

FIGS. 1A and 1B are conceptual diagrams that illustrate a wireless communication system, according to one embodiment. According to the present embodiment, a wireless communication apparatus $100a$ and user equipment $100b$ are assumed to be used in close physical proximity to each other.

The wireless communication apparatus $100a$ is, in embodiments, a digital camera that includes a wireless LAN function. The wireless communication apparatus $100a$ is configured to switch between functioning as a base station and functioning as a terminal. That is, if connection to a predetermined wireless LAN base station 200 is possible, the wireless communication apparatus $100a$ functions as the terminal with the wireless LAN base station 200 being set to be a connection destination for wireless devices (FIG. 1A). On the other hand, if predetermined wireless LAN base station 200 cannot be connected to, the wireless communication apparatus $100a$ functions as the base station (FIG. 1B).

On the other hand, the user equipment $100b$ (a wireless device) is, for example, a tablet terminal. Although the user equipment $100b$ also is a wireless communication apparatus, the user equipment $100b$ functions as a dedicated terminal, instead of as a base station. The user equipment $100b$ is configured to switch its connection destination between the predetermined wireless LAN base station 200 and the wireless communication apparatus $100a$. That is, if it is able to establish a connection to the wireless LAN base station 200, the user equipment $100b$ sets the wireless LAN base station 200 to be the connection destination (FIG. 1A). On the other hand, if it is not able to connect to the wireless LAN base station 200, the user equipment $100b$ sets the wireless communication apparatus $100a$, which functions as the base station, to be the connection destination (FIG. 1B).

According to embodiments, the predetermined wireless LAN base station 200 is, for example, a wireless LAN base station that is installed in the home. Furthermore, the wireless communication apparatus $100a$ and the user equipment $100b$ do not establish a connection to wireless LAN base stations other than the wireless LAN base station 200.

According to embodiments, wireless communication apparatus $100a$ and user equipment $100b$ are a wireless LAN communication apparatus that comply with the IEEE 802.11 wireless communication specification. As described herein, details of the present embodiment are assumed to be in compliance with IEEE 802.11 specifications.

According to the present embodiment, the wireless communication apparatus $100a$ and the user equipment $100b$ operate cooperatively in order to switch the functioning of the wireless communication apparatus $100a$ and to change the connection destination of the user equipment $100b$.

Figure 2:
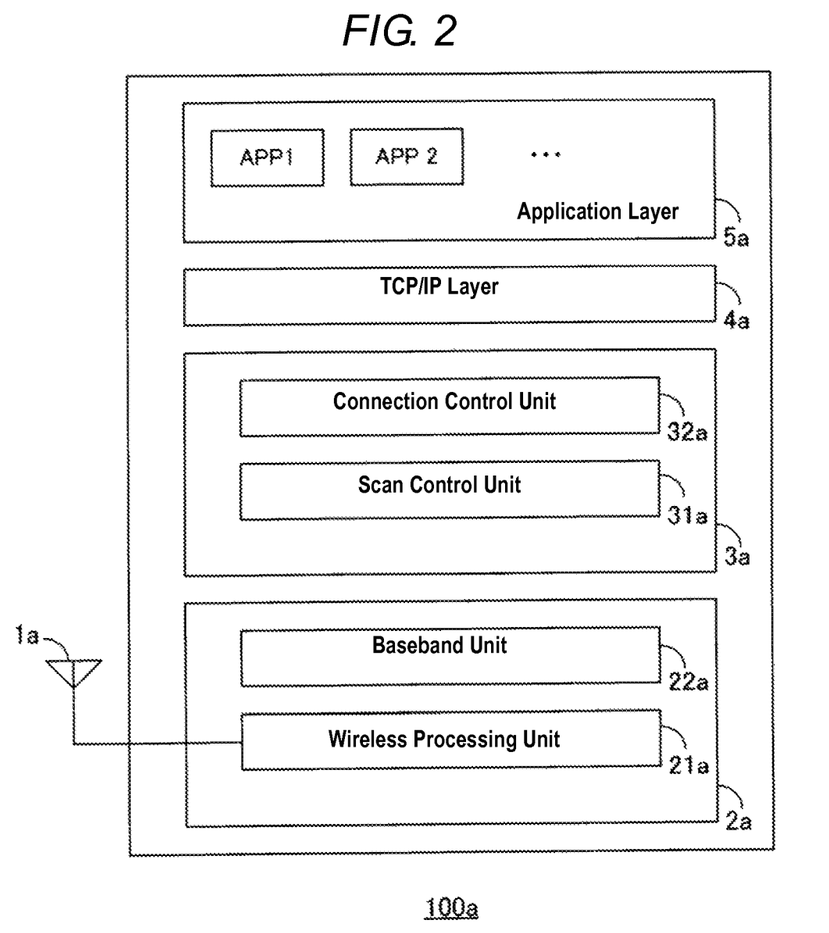
FIG. 2 is a conceptual diagram illustrating a configuration of a wireless communication apparatus, according to the embodiment.

FIG. 2 is a block diagram illustrating a configuration of the wireless communication apparatus $100a$, according to one embodiment. The wireless communication apparatus $100a$ includes an antenna $1a$, a physical layer $2a$, a media access control (MAC) link layer $3a$, a TCP/IP layer $4a$, and an application layer $5a$. The antenna $1a$ converts a wireless frequency analog signal into an electromagnetic wave during data transmission. Furthermore, antenna $1a$ converts the electromagnetic wave into the wireless frequency analog signal during data reception.

The physical layer 2a achieves a physical layer function that complies with given specifications, and includes a wireless processing unit 21a and a baseband unit 22a. The wireless processing unit 21a performs processing, such as amplification or frequency conversion between a wireless frequency and a baseband frequency, on a wireless frequency electrical signal. During data transmission, the baseband unit 22a modulates a signal to be transmitted, converts the modulated signal into an analog signal, and then supplies the result to the wireless processing unit 21a. Furthermore, during data reception, the baseband unit 22a converts the analog signal from the wireless processing unit 21a into a digital signal, and demodulates the resulting digital signal.

The MAC link layer 3a achieves a media access link layer function that complies with given specifications. Furthermore, in the present embodiment, the MAC link layer 3a includes a scan control unit 31a and a connection control unit 32a.

In addition to a normal scan function that complies with IEEE 802.11, when the wireless communication apparatus 100a functions as a terminal, the scan control unit 31a obtains the status of communication with the wireless LAN base station 200, a connection to which is in progress, and may report to the user equipment 100b whether or not its own station may establish a connection to the wireless LAN base station 200. Furthermore, a report as to whether or not the user equipment 100b may establish the connection to the wireless LAN base station 200 is received from the user equipment 100b.

Furthermore, when the wireless communication apparatus 100a functions as a base station, the scan control unit 31a does not itself scan for the wireless LAN base station 200, but rather receives from the user equipment 100b a report on whether or not the user equipment 100b finds the wireless LAN base station 200.

IEEE 802.11 specifications assume that a wireless LAN base station (e.g., wireless communication apparatus 100a when it functions as a base station) operates continuously using the same channel. For this reason, if the wireless LAN base station 200 operates using a channel different from the channel used by the wireless communication apparatus 100a, because the wireless communication apparatus 100a cannot find the wireless LAN base station 200, the wireless communication apparatus 100a receives a report on the result of the scan from the user equipment 100b.

The connection control unit 32a manages a configuration of the wireless communication apparatus, where the configuration is managed based on communication between the wireless communication apparatus 100a and the user equipment 100b.

More specifically, when the wireless communication apparatus 100a functions as a terminal, if the connection to the wireless LAN base station 200 cannot be established (or if the quality of the connection to wireless LAN base station 200 is poor), the connection control unit 32a reconfigures the wireless communication apparatus 100a to stop functioning as a terminal and to start functioning as a base station. Additionally, the connection control unit 32a performs connection processing on the user equipment 100b, and thus is given a connection from the user equipment 100b.

The connection control unit 32 comprises a nonvolatile memory and a register (not shown in FIG. 2). In the nonvolatile memory, there is a boot selection area that stores an indicator of the function of the connection control unit 32 as being either a terminal or a base station. In the register, there is an indication area to indicate the above two functions.

When the connection control unit 32 decides to switch its function, the connection control unit 32 writes an indication of the new function to the register and reboots with an indication of the new function in the nonvolatile memory.

For example, when the connection control unit 32 decides to switch from functioning as a terminal to functioning as a base station, the connection control unit 32 writes an indicator corresponding to functioning as a base station to the register and reboots with the indicator of the function set as a base station.

Alternatively, when the wireless communication apparatus 100a functions as a base station, if the user equipment 100b is able to locate the wireless LAN base station 200, the connection control unit 32a configures the wireless communication apparatus 100a to stop functioning as a base station and to start functioning as a terminal.

As a result of the switching between operating modes (i.e., from functioning as a base station to functioning as a terminal), wireless communication apparatus 100a stops periodic transmission of a beacon to indicate that the wireless communication apparatus 100a is a base station and, as a result, the user equipment 100b is unable to find the wireless communication apparatus 100a as the base station. Consequently, the user equipment 100b searches for another base station and, if the wireless LAN base station 200 is found, user equipment 100b establishes a connection to the wireless LAN base station 200.

The TCP/IP layer 4a implements various functions that include a general TCP/IP, an Address Resolution Protocol (ARP) or a Domain Name System (DNS), which accompanies the general TCP/IP.

The application layer 5a includes multiple applications (APP1, APP2, and so forth) that implement various end-user services.

Figure 3:
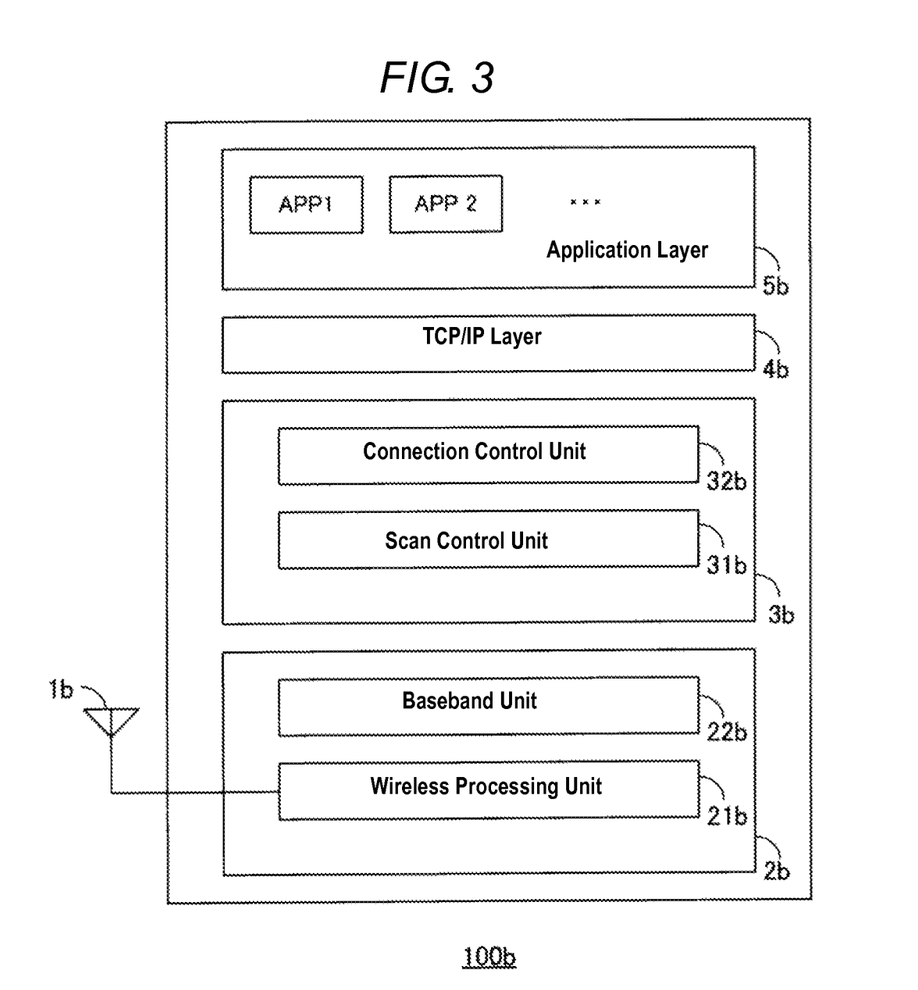
FIG. 3 is a conceptual diagram illustrating a configuration of user equipment, according to the embodiment.

FIG. 3 is a block diagram illustrating a configuration of the user equipment 100b, according to one embodiment. Description of features that user equipment 100b shares in common with wireless communication apparatus 100a is omitted.

In a MAC link layer 3b of the user equipment 100b, in addition to a normal scan function that is compliant with IEEE 802.11, when the connection destination is the wireless LAN base station 200, a scan control unit 31b is configured to obtain the status of communication with the wireless LAN base station 200 and reports to the wireless communication apparatus 100a information on whether or not the connection to the wireless LAN base station 200 can be established. Furthermore, a report on whether the wireless communication apparatus 100a can establish a connection to the wireless LAN base station 200 is received from the scan control unit 31a of the wireless communication apparatus 100a.

Furthermore, if the connection destination is the wireless communication apparatus 100a (when the wireless communication apparatus 100a functions as a base station), the scan control unit 31b scans for the wireless LAN base station 200. Then, whether or not the wireless LAN base station 200 is found is reported to the wireless communication apparatus 100a.

A connection control unit 32b manages a configuration according to which a network connection is established between the wireless communication apparatus 100a and the user equipment 100b.

More specifically, when an attempt to connect to the wireless LAN base station 200 is unsuccessful, the connection control unit 32b agrees with the wireless communication apparatus 100a that the wireless communication apparatus 100a functions as the base station, releases the connection to the wireless LAN base station 200, and switches the connection destination to the wireless communication apparatus 100a.

Alternatively, when a connection to the wireless communication apparatus 100a is attempted, if the wireless LAN base station 200 has been found, the connection control unit 32b switches the connection destination of user equipment 100b to the wireless LAN base station 200. At this time, a request may be transmitted to the wireless communication apparatus 100 to function as a terminal.

Figure 4:
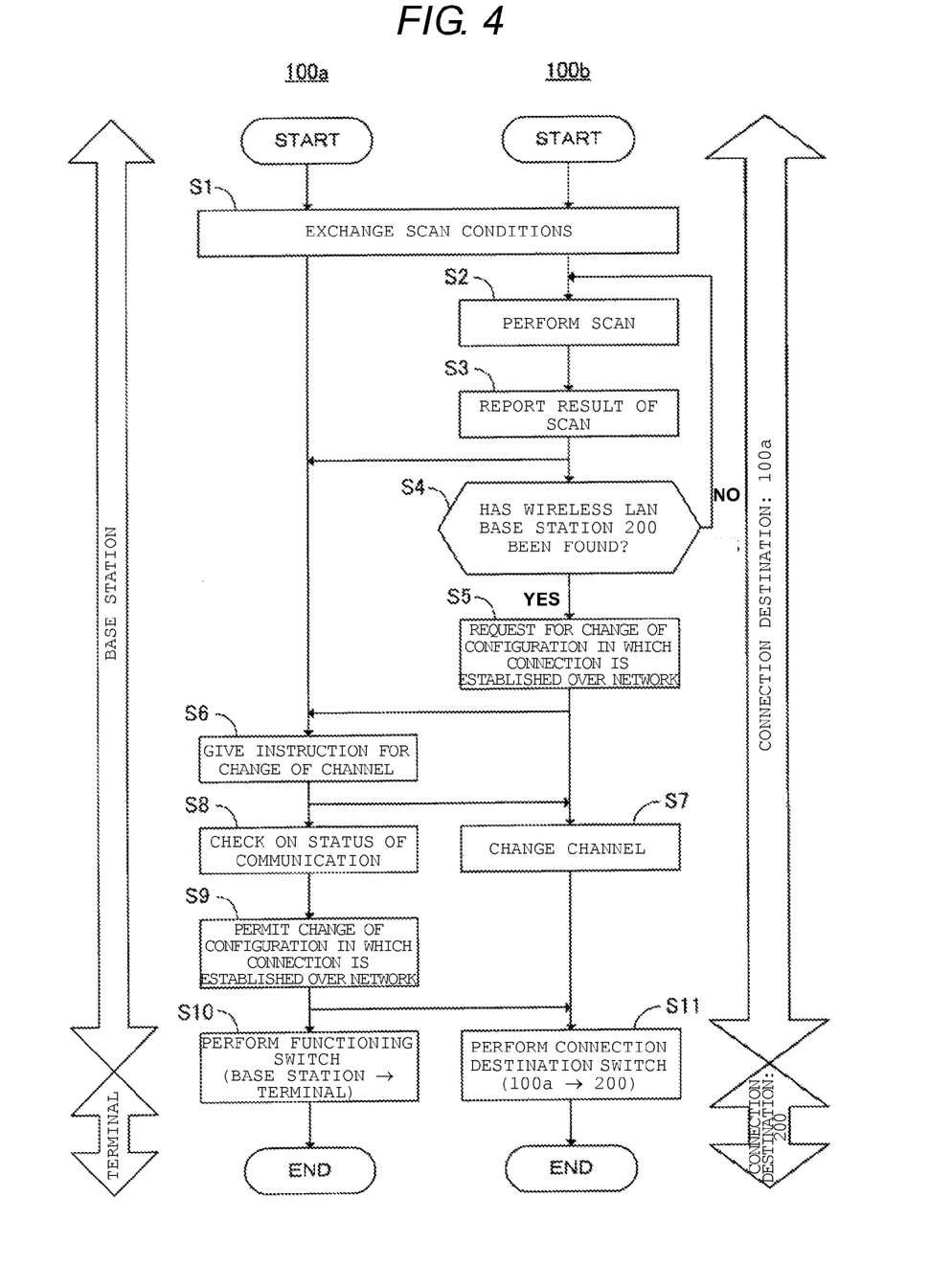
FIG. 4 is a flow diagram illustrating a first sequence of processing operations performed by the wireless communication apparatus and the user terminal, according to embodiments.

FIG. 4 is a flow diagram illustrating a first sequence of processing operations performed by the wireless communication apparatus 100a and the user equipment 100b. FIG. 4 assumes a situation in which the user who carries the wireless communication apparatus 100a and the user equipment 100b arrives at a location in which the wireless LAN base station 200 is in close proximity.

In FIG. 4, the user is distant from the wireless LAN base station 200, and the wireless communication apparatus 100a and the user equipment 100b cannot establish connectivity with the wireless LAN base station 200. Accordingly, the wireless communication apparatus 100a functions as the base station, and the user equipment 100b sets the wireless communication apparatus 100a to be the connection destination.

Subsequently, when the user comes into close proximity with the wireless LAN base station 200, the wireless communication apparatus 100a and the user equipment 100b may establish the connections to the wireless LAN base station 200. Consequently, the wireless communication apparatus 100a switches to functioning as a terminal that sets the wireless LAN base station 200 to be its connection destination, and the connection destination of the user equipment 100b is switched to the wireless LAN base station 200. A description is provided in detail below.

The wireless communication apparatus 100a and the user equipment 100b exchange scan conditions in advance (Step S1). More specifically, the scan control unit 31a of the wireless communication apparatus 100a and the scan control unit 31b of the user equipment 100b agree upon the scan conditions as follows.

First, a candidate for the connection destination of the wireless communication apparatus 100a and the user equipment 100b is set to be the predetermined wireless LAN base station 200. When the wireless LAN base station 200 is found, this finding is set to be an opportunity for changing the configuration in which the connection is established over the network.

Next, a wireless LAN base station that is different from the wireless LAN base station 200 is not a candidate for the connection destination of the wireless communication apparatus 100a and of the user equipment 100b. Although the other wireless LAN base station is found, this finding is not set to be an opportunity for changing the configuration in which the connection is established over the network.

Further, the user equipment 100b scans the wireless LAN base station 200 periodically at given intervals and reports to the wireless communication apparatus 100a on whether or not the wireless LAN base station 200 is found. Only when the wireless LAN base station 200 is found, the user equipment 100b may provide a report to the wireless communication apparatus 100a.

Specifically, based on the exchanged scan conditions, the scan control unit 31b of the user equipment 100b scans for the wireless LAN base station 200 (Step S2). Then, the scan control unit 31b reports to the wireless communication apparatus 100a, based on the scan results, whether or not the wireless LAN base station 200 is found (Step S3). If the wireless LAN base station 200 is found, the scan control unit 31b may report a channel that is used by the wireless LAN base station 200.

If the wireless LAN base station 200 is not found (i.e., NO in Step S4), the scan control unit 31b repeats the scan periodically.

When the wireless LAN base station 200 is found (YES in Step S4), the connection control unit 32b transmits a request over the network to the wireless communication apparatus 100a to change the configuration of the wireless communication apparatus 100a to switch from functioning as the base station to functioning as the terminal (Step S5).

Moreover, when the wireless communication apparatus 100a detects that the wireless LAN base station 200 has been found, if the wireless communication apparatus 100a is configured in such a manner that the wireless communication apparatus 100a automatically switches from functioning as the base station to functioning as the terminal, it is not necessary to request the wireless communication apparatus 100a to change its.

In order for the wireless communication apparatus 100a to switch to functioning as the terminal, both user equipment 100b and the wireless communication apparatus 100a need to check whether a connection to the wireless LAN base station 200 can be established. At this point, the wireless communication apparatus 100a needs to check on the status of communication with the wireless LAN base station 200, while continuing communication with the user equipment 100b. Accordingly, the connection control unit 32a of the wireless communication apparatus 100a requests the user equipment 100b to change a channel to the same one used by the wireless LAN base station 200 (Step S6). In response to this request, the connection control unit 32b of the user equipment 100b changes the channel (Step S7). As described above, based on the report (Step S3) from the user equipment 100b, the wireless communication apparatus 100a knows not only the presence of the wireless LAN base station 200, but also the channel that is used by the wireless LAN base station 200.

Next, the connection control unit 32a of the wireless communication apparatus 100a scans the channel used by the wireless LAN base station 200 and checks whether communication with the wireless LAN base station 200 is possible (Step S8). When it is verified that the connection control unit 32a of the wireless communication apparatus 100a may communicate with the wireless LAN base station 200, the connection control unit 32a of the wireless communication apparatus 100a permits the user equipment 100b to change the configuration in which the connection is established over the network (Step S9). The changing of the configuration in which the connection is established over the network specifically means that the connection destination of the user equipment 100b is switched from the wireless communication apparatus 100a to the wireless LAN base station 200.

As described above, the connection control unit 32b of the user equipment 100b switches the connection destination from the wireless communication apparatus 100a to the wireless LAN base station 200 (Step S11). Furthermore, the connection control unit 32a of the wireless communication apparatus 100a makes the wireless communication apparatus 100a switch to functioning as the terminal, where the wireless LAN base station 200 is set to be the connection destination (Step S10).

Moreover, the connection control unit 32a of the wireless communication apparatus 100a may implicitly permit the user equipment 100b to change the configuration in which the connection is established over the network (Step S9). In the case of implicit permitting, an explicit message is not exchanged. That is, if the connection control unit 32b of the user equipment 100b switches the connection destination from the wireless communication apparatus 100a to the wireless LAN base station 200 (Step S10), the user equipment 100b cannot receive the periodic beacon from the wireless communication apparatus 100a. For this reason, the user equipment 100b searches for another base station, a connection to which has to be established, and user equipment 100b selects the wireless LAN base station 200 automatically, and establishes a connection to the wireless LAN base station 200.

Figure 5:
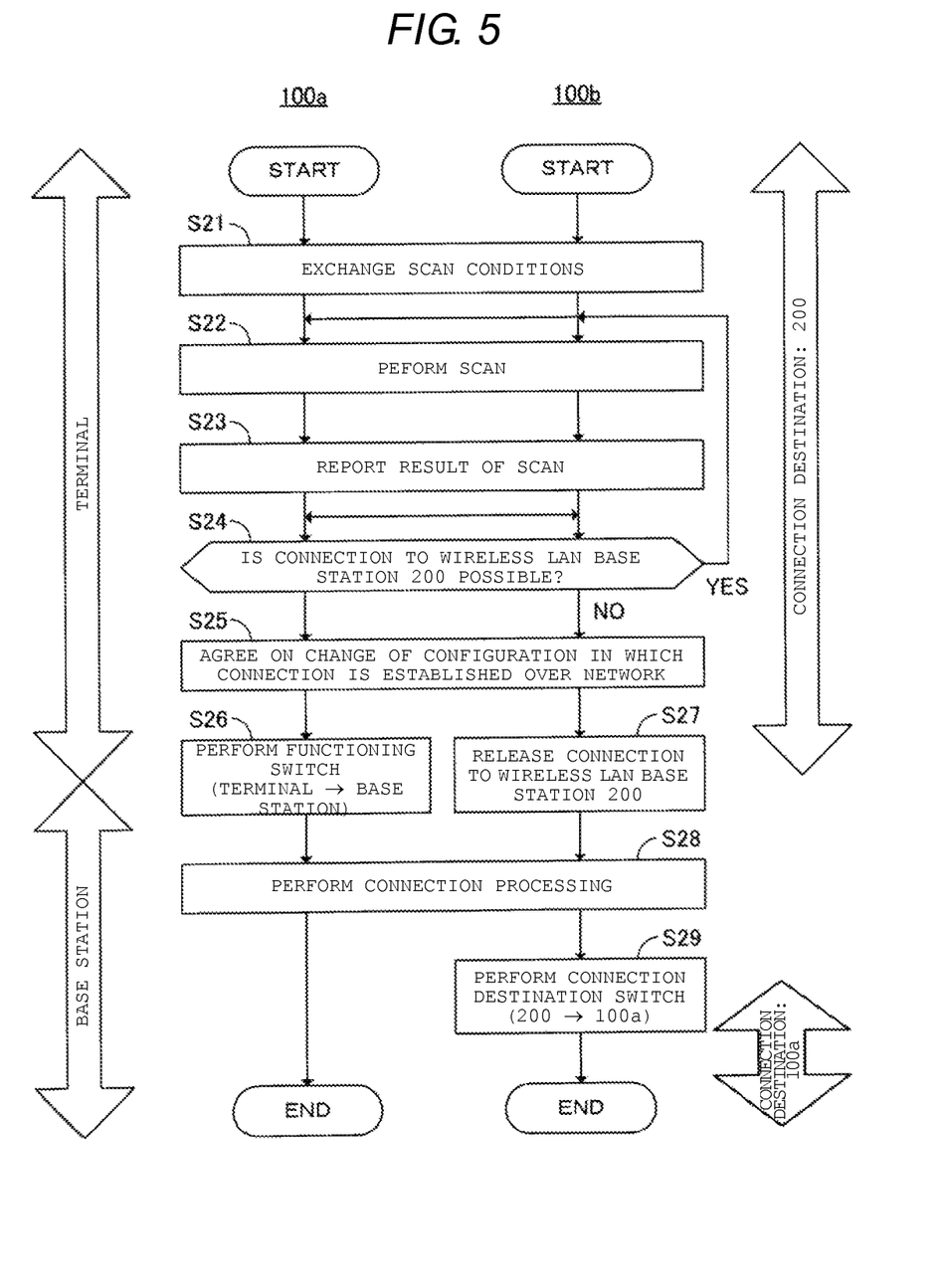
FIG. 5 is a flow diagram illustrating a second sequence of processing operations performed by the wireless communication apparatus and the user terminal, according to embodiments.

FIG. 5 is a flow diagram illustrating a second set of processing operations by the wireless communication apparatus 100a and the user equipment 100b, according to an embodiment. Contrary to FIG. 4, FIG. 5 assumes a situation in which the user who carries the wireless communication apparatus 100a and the user equipment 100b leaves a location at which wireless LAN base station 200 is physically located.

In FIG. 5, the user is first in close proximity with the wireless LAN base station 200, and the wireless communication apparatus 100a and the user equipment 100b establish connections with the wireless LAN base station 200. Consequently, the wireless communication apparatus 100a functions as the terminal that sets the wireless LAN base station 200 to be its connection destination. Furthermore, the user equipment 100b sets the wireless LAN base station 200 to be its connection destination.

Subsequently, when the user leaves location at which the wireless LAN base station 200 is located, the wireless communication apparatus 100a and the user equipment 100b cannot maintain the connections to the wireless LAN base station 200. Consequently, the wireless communication apparatus 100a switches from functioning as a terminal to functioning as a base station, and the connection destination of the user equipment 100b is switched to the wireless communication apparatus 100a. A description is provided in detail below.

The wireless communication apparatus 100a and the user equipment 100b exchange scan conditions in advance (Step S21). More specifically, the scan control unit 31a of the wireless communication apparatus 100a and the scan control unit 31b of the user equipment 100b agree to the scan conditions as follows.

First, the connection destination of the wireless communication apparatus 100a and the user equipment 100b is the predetermined wireless LAN base station 200. When the connection to the wireless LAN base station 200 cannot be established, this non-establishment is recognized as an opportunity for changing the configuration in which the connection is established over the network.

Next, the wireless communication apparatus 100a (when functioning as a terminal) and the user equipment 100b obtain the status of communication with the wireless LAN base station 200 periodically at given intervals. Then, the wireless communication apparatus 100a and the user equipment 100b report to each other whether or not the connection to the wireless LAN base station 200 may be established. Only if the connection may be established, the wireless communication apparatus 100a and/or the user equipment 100b may provide the report to each other.

More specifically, based on the exchanged scan conditions, the scan control unit 31a of the wireless communication apparatus 100a and the scan control unit 31b of the user equipment 100b obtain the status of communication with the wireless LAN base station 200 (Step S22). Then, the scan control units 31a and 31b report to each other whether or not the connection to the wireless LAN base station 200 may be established (Step S23). If the connection to the wireless LAN base station 200 may be established (YES in Step S24), the scan control units 31a and 31b periodically obtain the status of communication with the wireless LAN base station 200.

When both of the scan control units 31a and 31b recognize that the connection to the wireless LAN base station 200 cannot be established (NO in Step S24), both of the connection control units 32a and 32b agree upon the changing of the configuration in which the connection is established over the network (Step S25). The changing of the configuration in which the connection is established over the network means that the wireless communication apparatus 100a switches from functioning as a terminal to functioning as a base station, and the connection destination of the user equipment 100b is switched from the wireless LAN base station 200 to the wireless communication apparatus 100a.

Then, the connection control unit 32a of the wireless communication apparatus 100a is reconfigured from functioning as the terminal to functioning as the base station (Step S26).

Furthermore, the connection control unit 32b of the user equipment 100b releases the connection to the wireless LAN base station 200 (Step S27). Subsequently, the connection control unit 32b performs connection processing with the connection control unit 32a of the wireless communication apparatus 100a (Step S28). Accordingly, the wireless communication apparatus 100a that functions as the base station is set to be the connection destination of the user equipment 100b (Step S29).

As a result, the user equipment 100b needs to search for another base station for connection, because the connection to the wireless LAN base station 200 is lost. Under this situation, if the wireless communication apparatus 100a switches from functioning as the terminal to functioning as the base station (and thus begins to transmit the beacon), the user equipment 100b finds the wireless communication apparatus 100a as the base station. Then, the user equipment 100b automatically selects the wireless communication apparatus 100a as the base station, and establishes the connection thereto.

Moreover, FIG. 4 may be considered to be a continuation of FIG. 5. Accordingly, Step S1 in FIG. 4 is performed subsequent to Steps S28 and S29 in FIG. 5. In the same manner, FIG. 5 may be considered to be a continuation of FIG. 4. Accordingly, Step S21 in FIG. 5 is performed subsequent to Steps S10 and S11 in FIG. 4.

In this manner, according to the present embodiment, because the wireless communication apparatus 100a and the user equipment 100b operate cooperatively, not individually, the functioning of the wireless communication apparatus 100a and the connection destination of the user equipment 100b may be properly switched. That is, multiple wireless communication apparatus, called the wireless communication apparatus 100a and the user equipment 100b, may cooperatively switch between functioning operations and between connection destinations, respectively.

Moreover, the wireless LAN base stations, which the wireless communication apparatus 100a and the components of user equipment 100b may establish the connection to, may be two or greater in number, and for example, may include other base stations of network providers. In such a case, the priority of the connection destination may be set in advance to be the wireless communication apparatus 100a and the user equipment 100b.

If only one wireless LAN base station available for connection is found, the wireless communication apparatus 100a and the user equipment 100b may operate as illustrated in FIGS. 4 and 5. Furthermore, if two or more wireless LAN base stations available for connection are found, the wireless communication apparatus 100a and the user equipment 100b may set a high-priority wireless LAN base station to be a connection destination.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication apparatus that is connected to a wireless network, and is capable of functioning as a wireless network base station or as a wireless network terminal, the apparatus comprising:
a connection control unit configured to:
receive status information on whether the wireless communication apparatus and a wireless device are able to connect to a predetermined wireless base station, wherein if a scan by the wireless device locates the predetermined wireless base station, then the wireless device transmits to the wireless communication apparatus a scan report identifying a wireless channel over which the predetermined wireless base station communicates,
if at least one of the wireless communication apparatus and the wireless device is unable to connect to the predetermined wireless base station, configure the wireless communication apparatus to function as the wireless network base station which communicates directly with the wireless device, and
if both the wireless communication apparatus and the wireless device are able to connect to the predetermined wireless base station, configure the wireless communication apparatus to function as the wireless network terminal which communicates with the wireless device via the predetermined wireless base station.

2. The apparatus according to claim 1, wherein when the wireless communication apparatus is configured to function as the wireless network base station and a reconfiguration request is received from the wireless device that is connected to a local wireless network, the connection control unit is further configured to, in response to receiving the request, reconfigure the wireless communication apparatus to stop transmitting a periodic beacon, the periodic beacon providing an indication that the wireless communication apparatus is currently functioning as the wireless network base station.

3. The apparatus according to claim 2, wherein the connection control unit is further configured to send a request over the local wireless network to the wireless device to begin communicating over the wireless channel.

4. The apparatus according to claim 3, wherein the connection control unit is further configured to determine that the predetermined wireless base station is reachable over said wireless channel and performs said reconfiguring in response to the determining.

5. The apparatus according to claim 1, further comprising:
a scan control unit configured to receive the scan report from the wireless device, the scan report further indicating that the predetermined wireless base station has been located by the wireless device.

6. The apparatus according to claim 5, wherein the scan control unit is configured to, while the wireless communication apparatus functions as the wireless network terminal, periodically determine the status of communication between the wireless communication apparatus and the predetermined wireless base station; and
if said communication is impeded, then the connection control unit reconfigures the wireless communication apparatus to stop functioning as the wireless network terminal and to start functioning as the wireless network base station.

7. The apparatus according to claim 6, wherein the scan control unit is configured to transmit and receive in accordance with a wireless local area network communication standard.

8. A wireless device capable of switching a connection destination thereof from a predetermined wireless base station to a wireless communication apparatus, the wireless communication apparatus being capable of switching between functioning as a wireless network base station and functioning as a wireless network terminal, the wireless device comprising:
a scan control unit configured to:
while the connection destination of the wireless device is the wireless communication apparatus, perform a first scan to locate the predetermined wireless base station,
if the first scan by the scan control unit does not locate the predetermined wireless base station, then perform a second scan to locate the predetermined wireless base station,
if the first scan by the scan control unit locates the predetermined wireless base station, then:
determine a channel over which the predetermined wireless base station communicates; and
transmit a scan report to the wireless communication apparatus, the scan report identifying said channel over which the predetermined wireless base station communicates; and
a connection control unit configured to:
if the scan control unit locates the predetermined wireless base station, transmit a request to the wireless communication apparatus, wherein said request causes the wireless communication apparatus to be reconfigured to stop functioning as the wireless network base station and to start functioning as the wireless network terminal if both the wireless communication apparatus and the wireless device are able to connect to the predetermined wireless base station, wherein if at least one of the wireless communication apparatus and the wireless device is unable to connect to the predetermined wireless base station, the wireless communication apparatus is configured to function as the wireless network base station which communicates directly with the wireless device, and
change the connection destination of the wireless device from the wireless communication apparatus to the predetermined wireless base station if the wireless communication apparatus is reconfigured to function as the wireless network terminal.

9. The wireless device according to claim 8, wherein the connection control unit is further configured to:
receive a change channel request from the wireless communication apparatus; and
responsive to receiving the change channel request, change a channel over which the wireless device communicates from a first channel to said channel over which the predetermined wireless base station communicates.

10. The wireless device according to claim 9, wherein the scan control unit is further configured to:
while the connection destination of the wireless device is the predetermined wireless base station, perform a third scan to locate the predetermined wireless base station; and
if the predetermined wireless base station is located by the third scan, then perform a fourth scan to locate the predetermined wireless base station.

11. The wireless device according to claim 10, wherein the connection control unit is further configured to, if the predetermined wireless base station is not located by the third scan, change the connection destination of the wireless device from the predetermined wireless base station to the wireless communication apparatus.

12. A method of wireless communication, the communication occurring between a wireless device, a wireless communication apparatus capable of switching between functioning as a wireless network base station and functioning as a wireless network terminal, and a predetermined wireless base station, the method comprising:
setting, by the wireless device, a communication destination of the wireless device to the wireless communication apparatus;
performing a first scan, by the wireless device, to determine whether the wireless device is able to connect to the predetermined wireless base station;
if the first scan determines the wireless device is able to connect to the predetermined wireless base station, then transmitting, by the wireless device, a scan report to the wireless communication apparatus, the scan report identifying a channel over which the predetermined wireless base station communicates;
performing a second scan, by the wireless communication apparatus, to determine whether the wireless communication apparatus is able to connect to the predetermined wireless base station;
if at least one of the wireless communication apparatus and the wireless device is unable to connect to the predetermined wireless base station, configuring the wireless communication apparatus to function as the wireless network base station which communicates directly with the wireless device; and
if both the wireless communication apparatus and the wireless device are able to connect to the predetermined wireless base station, configuring the wireless communication apparatus to function as the wireless network terminal which communicates with the wireless device via the predetermined wireless base station.

13. The method of claim 12, further comprising:
receiving, by the wireless communication apparatus, the reconfiguration request;
performing the second scan, by the wireless communication apparatus, of the channel over which the predetermined wireless base station communicates;
based on the scanning, determining, by the wireless communication apparatus, whether communication with the predetermined wireless base station is possible.

14. The method of claim 13, further comprising:
responsive to receiving a change channel request from the wireless communication apparatus, changing, by the wireless device, a channel over which the wireless device communicates from a first channel to said channel over which the predetermined wireless base station communicates.

15. The method of claim 14, further comprising:
performing a third scan, by the wireless device, to locate the predetermined wireless base station; and
upon determining, by the wireless device, that the predetermined wireless base station is not located by the third scan, setting, by the wireless device, the communication destination thereof to the wireless communication apparatus.

16. The method of claim 15, further comprising:
if the predetermined wireless base station was not located by the third scan, then reconfiguring the wireless communication apparatus to stop functioning as the wireless network terminal and to start functioning as the wireless network base station.

17. The method of claim 16, further comprising:
determining, by the wireless device, that the predetermined wireless base station is located by the third scan; and
responsive to the determining, performing a fourth scan to locate the predetermined wireless base station.

* * * * *